Oct. 30, 1923.
G. W. JONES
1,472,527
HOOF HOLDER
Filed April 18, 1922
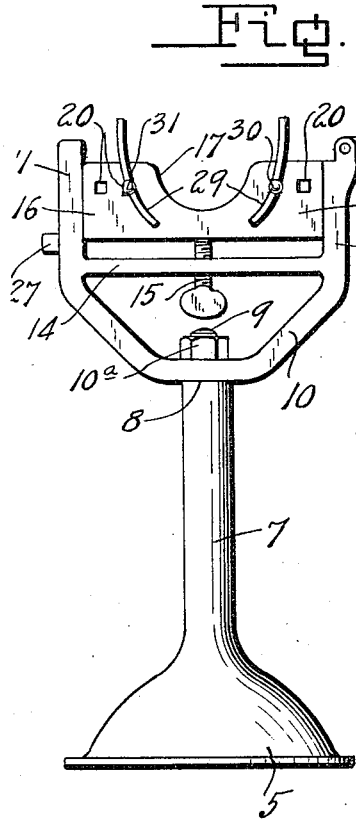
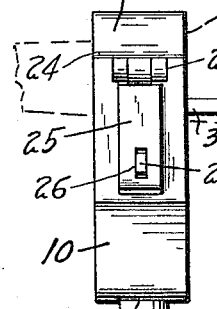
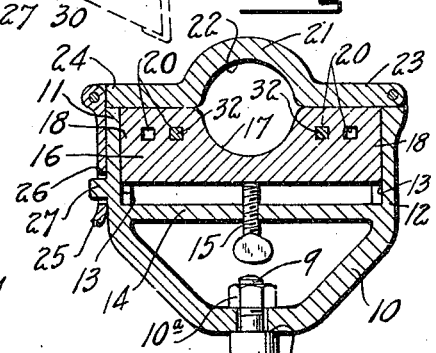
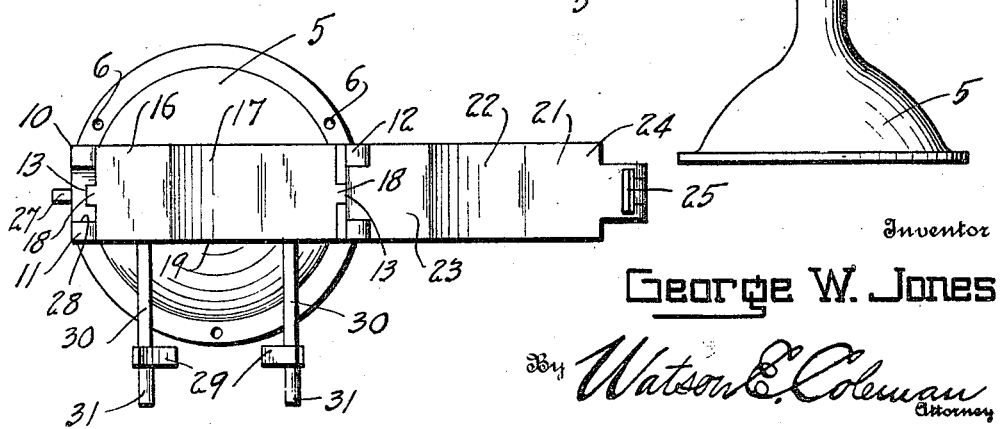
Inventor
George W. Jones
By Watson E. Coleman
Attorney Patented Oct. 30, 1923.

1,472,527

UNITED STATES PATENT OFFICE.

GEORGE W. JONES, OF GUM NECK, NORTH CAROLINA.

HOOF HOLDER.

Application filed April 18, 1922. Serial No. 554,567.

*To all whom it may concern:*

Be it known that I, GEORGE W. JONES, a citizen of the United States, residing at Gum Neck, in the county of Tyrrell and State of North Carolina, have invented certain new and useful Improvements in Hoof Holders, of which the following is a specification, reference being had to the accompanying drawings.

This invention relates to hoof holding devices, and more particularly to horse hoof holding devices.

An object of the invention is to provide a holder of this character which will properly hold the hoof of an animal in position for treatment such as for trimming, or for shoeing.

Another object of the invention is to provide a holder of this character wherein any hoof of the animal may be properly secured and held in position without danger of the animal kicking and without causing injury to the animal in case the animal should become restless.

Another object of the invention is to provide a holder of this character which can be permanently secured to the floor or ground and yet permitted to turn so as to be positioned relative to the legs of the animal, without requiring maneuvering of the animal in order to apply the hoof to the holder.

It is also an object of the invention to provide a holder of this character including a movable frame in which an adjustable support is mounted, the frame having a clamp for holding a portion of the leg of the animal within the frame, the recess for the leg of the animal being of a size to prevent disengagement of the hoof from the holder by the animal.

It is still a further object of the invention to provide a holder of this character wherein the supporting means is provided with adjustable hoof holding means, whereby not only the pastern joint of the leg is supported, but the hoof portion thereof.

With these and other objects in view, the invention consists in the improved construction and arrangement of parts, to be hereinafter more particularly described, fully claimed, and illustrated in the accompanying drawings, in which:

Figure 1 is a side elevation of a hoof holder constructed in accordance with an embodiment of the invention, the holder being shown in its open position;

Fig. 2 is an end elevation, the animal's hoof being shown in dotted lines;

Fig. 3 is a longitudinal sectional view of the frame and supporting means; and

Fig. 4 is a top plan view of the structure shown in Fig. 1.

Referring to the drawings, 5 designates a base member, relatively wide, the base member having a plurality of openings 6 for the reception of fastening means to render the base stationary. Positioned centrally of the base and formed integral therewith is a standard 7, the upper end of the standard being reduced to provide a shoulder 8 and a threaded stem 9, the purpose of which will be hereinafter described. It is of course obvious that the base 5 may be made relatively heavy, so as to properly support the leg of an animal without requiring the base to be secured to the floor.

In connection with the base 5, a frame 10 is provided, said frame being substantially U-shaped, the bight portion of the frame having an opening adapted to receive the stem 9, a nut 10ª being threaded on the stem to prevent disengagement of the frame from the standard, and at the same time permit rotary movement of the frame on the standard. The arms 11 and 12 of the frame are provided with channels 13, said channels extending from the ends of the arms to the central portion thereof. Extending laterally of the frame 10 is a bearing member 14 having a central opening adapted to receive a set-screw 15.

To support the hoof of the animal, or in other words, the pastern joint, a novel supporting member 16 is provided, in the form of a block having a central recess 17, the recess corresponding in shape to the shape of the pastern joint of the animal. Projecting from each end of the supporting member 16 is a tongue 18, said tongues being adapted to extend into the channels 13 so as to prevent disengagement of the support from the frame upon adjustment of the support. The side face 19 of the supporting member 16 is provided with a plurality of openings 20, said openings being substantially rectangular, one pair of openings being disposed on each side of the recess 17, the purpose of which will be hereinafter described. To clamp the pastern joint within the recess 17, a clamping member 21 is provided, said member being formed from the material used in the construction of the frame 10 and having its central portion bowed to provide a recess 22 adapted to coact with the recess 17 of the bearing member 16 to provide an opening for the pastern joint. The end 23 of the clamp 21 is hinged to the arm 12 of the frame, said clamp being adapted to extend over the open end of the frame and to engage the extremity of the arm 11, so as to form the opening just described. Hinged to the end 24 of the clamp 21 is a hasp member 25 having an opening 26 adapted to engage a lug 27 which projects from the outer face of the arm 11 below the end of said arm. The arm 11 is slightly longer than the arm 12 and has a recess 28 in its extremity adapted to receive the end portion 24 of the clamp 21 so as to prevent lateral movement of the clamp 21 when in use.

The pastern joint is intended to be disposed within the recess 17 and the clamp 21 swung over and fastened by means of the hasp 25. This positions the hoof to one side of the supporting member 16. In order to prevent unnecessary movement of the hoof there is provided novel holding means 29 in the form of an arcuate strip, having a shank 30 secured to the central portion of the convex side of each strip, the end 31 of the shank extending beyond the strip to provide a handle, while the opposite end 32 is adapted to extend into one of the openings 20 of the bearing member 16. Two of these holding members are provided, one being positioned on each side of the recess 17 of the bearing member and cooperating with each other to provide a semi-circular member adapted to receive the hoof of the animal. In view of the fact that a plurality of openings 20 are provided in the face 19 of the supporting member, it is possible to adjust the holding means according to the size of the hoof.

From the foregoing it will be readily seen that this invention provides a novel device for holding the hoof of an animal in the desired horizontal position for shoeing and trimming without danger of the animal kicking and without requiring the attendant to hold the hoof of the animal while working. In addition to this, there is no danger of the leg of the animal being injured, as it is possible for the frame 10 to rotate so as to move with the animal in case the animal becomes restless. In addition to this, the block 16 may be adjusted within the frame, according to the size of the pastern joint, while the holding members may be also adjusted according to the size of the hoof, and all of these features are possessed by a device which is simple in construction and may be easily operated.

What is claimed is:—

1. A hoof holder comprising a base, a frame movably connected to the base, a supporting member slidably mounted in the frame, means carried by the frame for holding the supporting member in various adjusted positions, and a clamping member hinged to the frame to provide a leg opening, and auxiliary means carried by the supporting member and coacting with the supporting member to hold a hoof.

2. A hoof holder comprising a base, a frame movably connected to the base, a supporting member slidably mounted in the frame, means carried by the frame for holding the supporting member in various adjusted positions, and a clamping member hinged to the frame to provide a leg opening, and auxiliary means carried by the supporting member and coacting with the supporting member to hold a hoof, said auxiliary holding means being adjustable on the supporting member according to the size of the hoof.

3. A hoof holder comprising a base, a standard carried by the base, a frame rotatably mounted on the standard, a bearing member disposed within the frame, an adjusting screw carried by the bearing member, a block slidable within the frame and supported by said adjusting screw, a clamp hinged to one end of the frame and adapted to extend over the supporting member, said clamp and supporting member cooperating to provide an opening adapted to receive a portion of the leg of an animal, means carried by the clamp for securing the same to the frame, and adjustable hoof engaging means projecting from one face of the supporting member.

In testimony whereof I hereunto affix my signature.

GEORGE W. JONES.